United States Patent [19]

Baron et al.

[11] Patent Number: 4,530,888
[45] Date of Patent: Jul. 23, 1985

[54] BATTERY WITH GRAPHITE-MANGANESE CHLORIDE INSERTION COMPOUND

[75] Inventors: Francis Baron, Begles; Serge Flandrois, Pessac; Adolphe Pacault, Talence, all of France

[73] Assignee: Centre National de la Recherche Scientifique, Paris, France

[21] Appl. No.: 490,569

[22] Filed: May 2, 1983

[30] Foreign Application Priority Data

May 4, 1982 [FR] France .................. 82 07736

[51] Int. Cl.³ .............................................. H01M 6/04
[52] U.S. Cl. .................................... 429/206; 429/224
[58] Field of Search .............................. 429/224, 206; 252/182.1

[56] References Cited

U.S. PATENT DOCUMENTS

| | | | |
|---|---|---|---|
| 3,785,999 | 1/1974 | Derleth et al. | 252/441 |
| 4,041,220 | 8/1977 | Armand | 429/218 |
| 4,145,483 | 3/1979 | Bonnemay | 429/103 |

FOREIGN PATENT DOCUMENTS 2100192  3/1972  France .
2364547  4/1978  France .

OTHER PUBLICATIONS

Chemical Abstracts, vol. 66, No. 14, Apr. 3, 1967, p. 5589, Abstract 59249d, E. Stumpp et al., "Graphite Intercalation Compounds with Chlorides of Manganese, Nickel and Zinc".

Chemical Abstracts, vol. 94, No. 13, Jun. 1981, p. 527, Abstract 216434h, Flandrois et al., "Intercalation Compounds of Graphite with Nickel Chloride as Cathode Material for Alkaline Batteries".

*Primary Examiner*—Charles F. Lefevour
*Attorney, Agent, or Firm*—Dressler, Goldsmith, Shore, Sutker & Milnamow, Ltd.

[57] ABSTRACT

The present invention relates to a new cathode material constituted by a manganese chloride and graphite material, the process for its preparation as well as the electrochemical batteries which use such a material as cathode.

The cathode material according to the present invention is characterized in that it is constituted by an insertion compound of graphite with manganese chloride the formula of which is:

$$C_x MnCl_y \, ps$$

in which:

$X = 5.6 \pm 0.1$ and $y = 2.4 \pm 0.1$.

3 Claims, 6 Drawing Figures

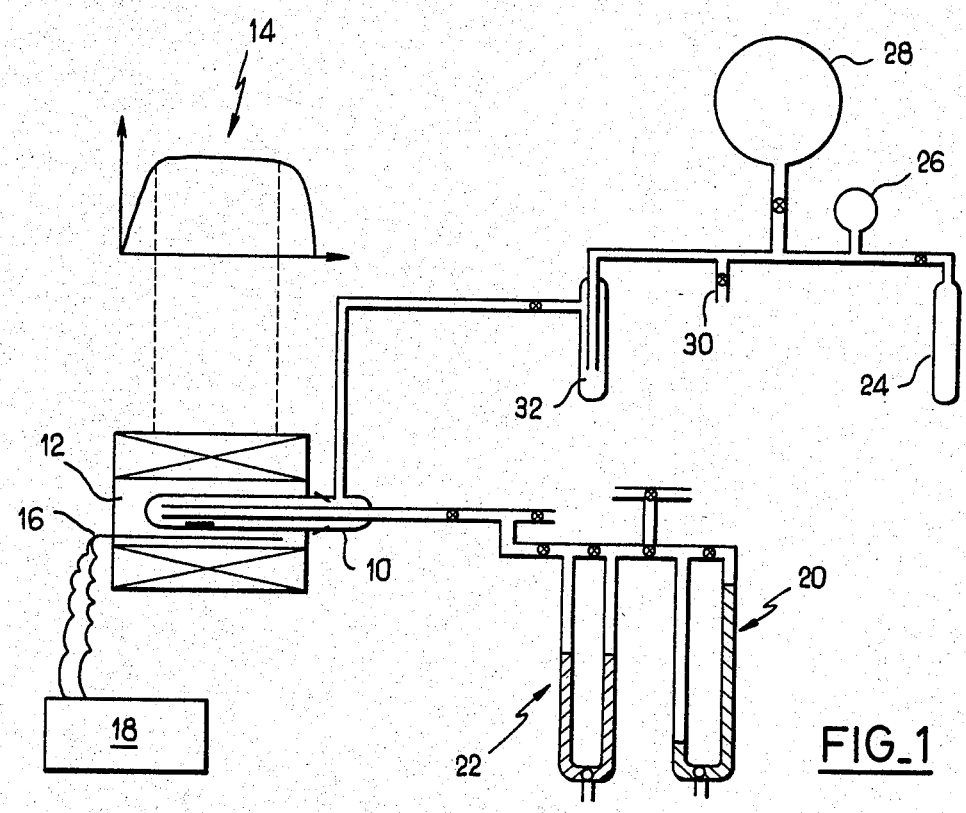
FIG_1
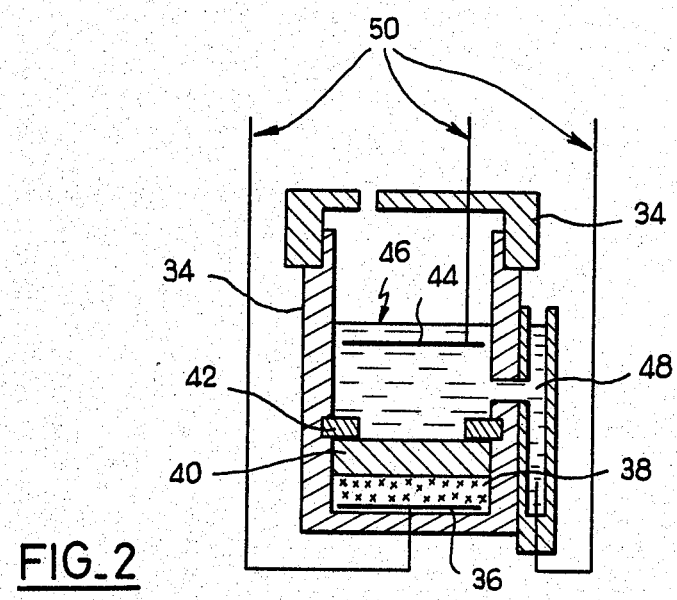
FIG_2

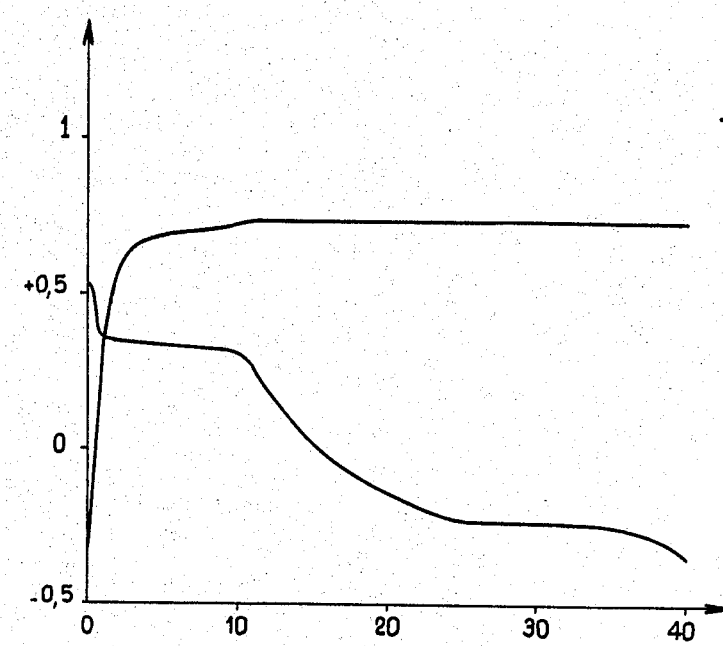
FIG_3
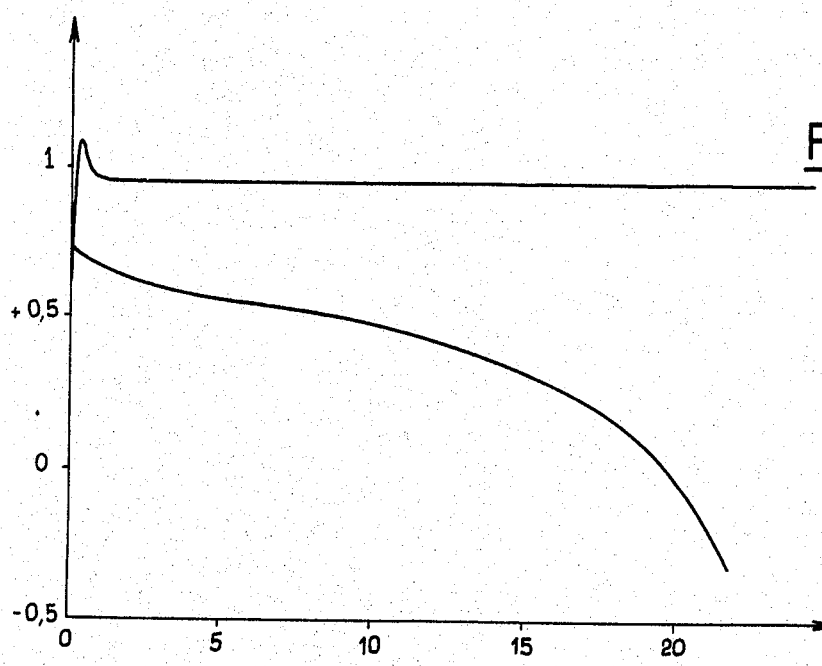
FIG_4

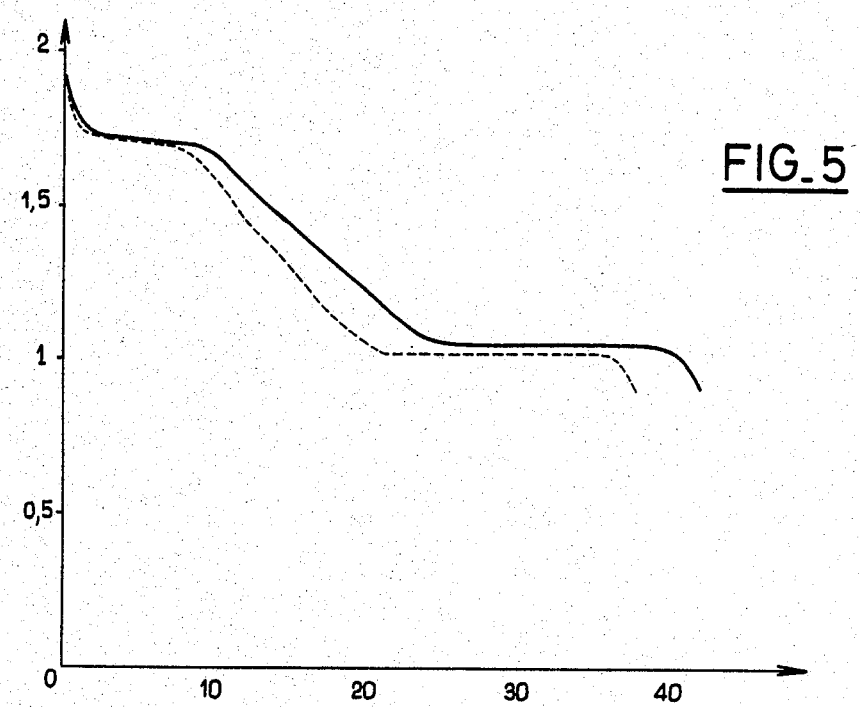
FIG_5
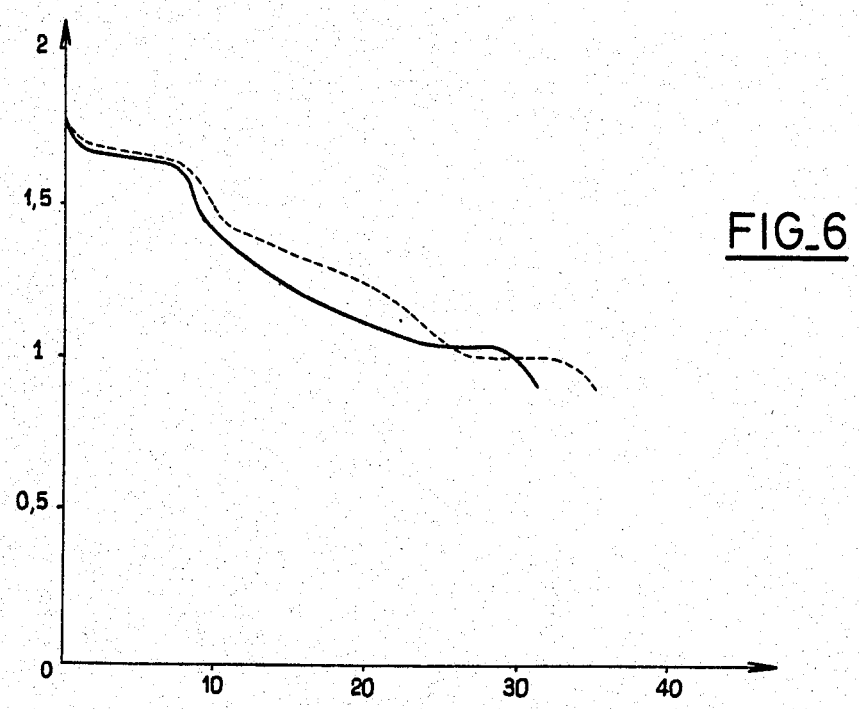
FIG_6

BATTERY WITH GRAPHITE-MANGANESE CHLORIDE INSERTION COMPOUND

The present invention relates to a new cathode material constituted by an insertion compound of graphite with manganese chloride, the process for its preparation as well as the electrochemical batteries (accumulators) using such a material as cathode.

In the prior technique, it has already been suggested to use, as cathode material, various compounds of insertion of graphite with metallic chlorides, and especially with nickel chloride. However, although the charge-discharge cycles has been performed under very smooth conditions, it has been found that the yields in Coulombs were rather low. The useful capacity which could be recovered in electrochemical accumulators using such cathode material, thus, were insufficient.

The present invention relates to a new cathode material for electrochemical accumulators, constituted by an insertion compound of graphite with manganese chloride, the formula of which is:

$$C_xMnCl_y$$

in which:
$x = 5.6 \pm 0.1$
$y = 2.4 \pm 0.1$

In practice, it has been found that such an insertion compound presented, when compared with the graphite-nickel chloride insertion compounds, a certain number of definite advantages, among which there will especially be noted:

The graphite-manganese chloride compounds of insertion can be used in the presence of electrolytes with any pH range, while the corresponding insertion compounds with a nickel chloride base can be used only in an alkaline medium.

Theoretically, manganese can be oxidized from $Mn^{2+}$ to $Mn^{7+}$, while for nickel a state of maximum oxidation can be obtained only for $Ni^{4+}$; thus manganese makes possible a theoretical possible storage of 5 Faraday instead of 2 Faraday only for nickel.

Because of the very low oxido-potential ($-1.5$ Volt, approximately) of the reaction $Mn^{2+} \rightarrow Mn^0$, there can be no reduction of manganese in the oxidation state $2+$ into metallic manganese inside the graphite. On the other hand, such a reduction to the metallic state reaction is observed in the case of nickel (oxido-reduction potential in a strongly alkaline medium approximately 0.9 Volt), said reaction being irreversible and producing a deterioration of the electrode which could be observed, especially, in the case of error in the connection of the battery when charging.

The insertion compound of graphite with manganese chloride is an insertion compound of the first stage, which satisfies the formula $C_xMnCl_y$ with $x=5.6\pm0.1$ and $y=2.4\pm0.1$, while nickel can lead only to an insertion compound of the second stage the formula of which is $C_xNiCl_y$ with $x=11.3$ and $y=2.13$. The insertion compound having manganese as its base therefore is richer in active material.

Preparation of the insertion compound of graphite with manganese chloride is done under the reaction conditions which are smoother than those necessary for obtaining the insertion compound with a nickel base; the insertion temperature of manganese, especially, is lower by more than 100° C. than that of nickel.

Manganese, which is the eleventh element of the earth crust, is much cheaper than nickel.

Manganese is used in a classical manner as cathode in Leclanché type batteries (piles) ($MnO_2$-Zn couple). The fabrication of such piles or batteries comes to approximately 10 times the price of the stored energy, and it thus would be very cost-valuable to be able to make them so that they can be re-charged. The insertion compound of graphite-manganese chloride according to the present invention precisely makes it possible to re-charge such a type of electrochemical battery the cathode of which is constituted by said insertion compound.

The present invention also relates to the process for the preparation of the insertion compound of graphite with manganese chloride, which consists in heating a powder mixture of graphite and of anhydrous manganese chloride under a chlorine atmosphere and at a temperature of 500° C., approximately.

Advantageously, the powder mixture used to start contains the manganese chloride in excess relative to the graphite, and more especially, it contains approximately 1 part by weight of graphite for approximately 3 parts by weight of anhydrous manganese chloride.

The present invention also relates to electrochemical batteries which comprise a cathode constituted, precisely, by the insertion compound of graphite with manganese chloride, such as defined above.

Other characteristics and advantages of the present invention will appear upon reading of the detailed description which follows. especially with reference to the attached drawing in which:

FIG. 1 represents the diagram of an installation making possible the execution of the process according to the present invention.

FIG. 2 represents the diagram of a polarization cell used for the execution of various electrochemical tests bearing on the insertion compound according to the present invention.

FIG. 3 represents the charge-discharge curves of a $C_{5.6}MnCl_{2.4}$ electrode in an alkaline medium.

FIG. 4 represents the charge-discharge curves of an electrode $C_{5.6}MnCl_{2.4}$ in an acid medium.

FIG. 5 represents the discharge curve of the battery:

$$C_{5.6}MnCl_{2.4}//KOH(ion)//Zn$$

FIG. 6 represents the discharge curve of the battery:

$$(C+MnO_2)//KOH(ion)//Zn.$$

The graphite insertion compound with manganese chloride, according to the present invention, may advantageously be obtained by heating in a quartz tube connected to a source of chloride with insertion of a manometric device which makes it possible continuously to measure of chlorine pressure during the reaction. FIG. 1 schematically illustrates one example of such an installation making possible the execution of the process according to the invention. That installation comprises a quartz reaction tube 10 placed in a tubular oven 12 the temperature gradient of which is controled such as schematically represented in 14. The oven temperature is measured by means of a suitable device, for example a Chromel-Alumel thermometer 16, and it is recorded on an auxiliary tracing device (Servotrace) 18 which also serves as time base. The quartz tubular reactor 10 further is connected to a mercury pressure gauge 20 protected by another pressure gauge 22 of the sulfuric acid type, making it possible to perform pressure measurements during the insertion reaction. The source of chlorine which feeds the quartz tubular reactor 10 may, for example, is constituted by a chlorine bottle 24 connected to the reactor by a feeding duct which respectively comprises a safety gas balloon 26, a chlorine reserve 28, a vacuum connection 30 and a drying flask 32. Systematic tests carried out with such a type of installation have shown that by using Madagascar graphite which presents itself in the form of flakes with an average particle diameter inferior to 1 mm approximately, the insertion reaction was completed in a few hours, at a temperature of the order of 500° C. and under a chlorine pressure equal to approximately 700 mm of mercury. There will be indicated below, as an illustration, a particular example of preparation of the insertion compound of graphite and manganese chloride according to the invention.

First of all 1 gram of Madagascar graphite in flake form ($\phi < 1$ mm) is mixed with 3 grams of anhydrous manganese chloride in powder form. That mixture is then placed into the quartz tubular reaction and heated first of all under vacuum and progressively up to a temperature approximately equal to 500° C. After stabilization of the oven temperature, the chlorine gas is introduced under a pressure equal to 700 mm of mercury. It is observed that the insertion of manganese chlorine immediately begins and is entirely completed in a few hours. After cooling to room temperature, the insertion compound thus obtained is recovered, it is then washed with hydrochloric acid in diluted form, and with water in order to remove the excess of manganese chloride, then the final product is dried in an oven. Under such conditions of operation, there are obtained 3.1 grams of insertion compound which compound is analyzed by means of the classical methods and the composition of which satisfies the following formula:

$$C_{5.6 \pm 0.1}MnCl_{2.4 \pm 0.1}.$$

That insertion compound was subjected to a certain number of electrochemical tests carried out with a polarization cell illustrated in FIG. 2. The body 34 of that cell is, for example, advantageously executed of plexiglass, a material which resists well the concentrat potash solutions. The lower part of said cell comprises an electrode support of insertion compound which presents itself in the form of a platinum sheet 36 on which there rests the insertion compound 38 which is capped with a pastil or pellet of partially fused glass, 40, held in place by means of tightening rings 42. The cell also comprises a counterelectrode 44, made of platinum for example, and the electrolyte in which those two electrodes 40 and 44 are immersed, electrolyte 46, is constituted, for example, by an aqueous solution of 10N potash. A reference electrode Hg/HgO 48 makes it possible to perform the potential measurements. It will finally be noted that the polarization circuit comprises a stabilized current supply (feeding) as well as a milliammeter, and that the connection wires 50 of the electrodes are made of platinum. That polarization cell was connected to a recording device which makes it possible to follow the evolution of the potential as a function of time.

In practice, it has been observed that the formation of the active material is relatively slow, since several cycles are necessary. Considering that a slight temperature rise accelerates that formation, all of the tests were carried out, generally, while maintaining the polarization cell at a temperature of the order of 50° C. It will finally be noted that, when the active material has been formed, it is possible, without any drawback, to perform the various charge-discharge cycles at a constant current. The various tests carried out with that polarization cell have made it possible to observe the following phenomena:

a. Behavior of the $C_{5.6}MnCl_{2.4}$ electrode in alkaline medium:

FIG. 3, attached, represents the charge-discharge curves typically obtained in the case in which the electrolyte is 10N potash. The potential measured relative to the reference electrode Hg/HgO leads to a diagram the comparison of which with the diagrams of oxido-reduction potential of POURBAIX atlas shows that $Mn^{7+}$ was formed during oxidation (charge). The first observation shows that the $C_{5.6}MnCl_{2.4}$ electrode thus can be used as cathode material in an alkaline medium.

b. Behavior of the $C_{5.6}MnCl_{2.4}$ electrode in an acid medium:

FIG. 4 attached represents the charge-discharge curves obtained in the case when the electrolyte is sulfuric acid at 0.5N. The reference electrode is constituted by the Hg/HgO couple. A single discharge was obtained, corresponding to the reaction $Mn^{4+} \rightarrow Mn^{2+}$. That shows that the insertion compound according to the invention can be used as cathode in an acid medium.

c. $C_{5.6}MnCl_{2.4}$//KOH//Zn Battery

FIG. 5 attached represents the discharge curve of a $C_{5.6}MnCl_{2.4}$//KOH//Zn battery during the third and the fourth cycles.

The execution of such a battery was achieved, for example, using the above defined polarization cell in which, however, the platinum counterelectrode was replaced with another metallic electrode, such as zinc, cadmium or iron. The voltage at the terminals is measured during the discharge between the metallic zinc electrode and the insertion compound electrode. The f.e.m. in open circuit prior to the discharge is approximately 2 volts. The discharges were carried out as far as 0.9 volt, which is the lower limit of the practically usable voltage. Upon examination of the diagram in FIG. 5, it can be seen that during the fourth cycle the active material is not completely formed, since there is still recorded a capacity gain, relative to the third cycle.

d. Comparison with the classical $MnO_2/Zn$ system:

The graphite-manganese chloride insertion compound was replaced in the above defined polarization cell with a mixture of natural graphite flakes and of electrolytic manganese dioxide, in proportions such that the quantity of manganese is rigourously the same as in the insertion compound according to the present invention.

FIG. 6 attached shows the discharge curved obtained during the third and fourth cycles under the same conditions as previously. It is observed that, as early as the fourth cycle, there occurs a loss of capacity and that in sixth cycle, the capacity is almost null. That experiment clearly shows, thus, the definite improvement in re-chargeability resulting from the use of a cathode constituted by the insertion compound according to the present invention.

It is obvious that the present invention cannot be limited to the particular mode of execution which has been described above, but it is perfectly possible, without for as much leaving the scope of the present invention, to imagine a certain number of its variations in execution.

We claim:

1. In an electrochemical battery comprising a cathode, an anode and an aqueous electrolyte, the improvement wherein said cathode comprises an insertion compound of graphite with manganese chloride of the formula:

$$C_xMnCl_y$$

in which:

$x = 5.6 \pm 0.1$ and
$y = 2.4 \pm 0.1$.

2. The battery of claim 1 in which said anode comprises a metal of the group consisting of zinc, cadmium and iron, and said electrolyte is an alkaline electrolyte.

3. The battery of claim 2 in which said electrolyte comprises potash.

* * * * *